(12) United States Patent
Kohno et al.

(10) Patent No.: US 7,490,436 B2
(45) Date of Patent: Feb. 17, 2009

(54) METHOD OF PREVENTING DEFECTIVE GERMINATION OR GROWTH OF PLANT

(75) Inventors: Yasushi Kohno, Hyogo (JP); Noritoshi Katsutani, Hiroshima (JP)

(73) Assignee: Agritecno Yazaki Co., Ltd., Hyogo (JP)

( * ) Notice: Subject to any disclaimer, the term of this patent is extended or adjusted under 35 U.S.C. 154(b) by 1028 days.

(21) Appl. No.: 09/837,020

(22) Filed: Apr. 18, 2001

(65) Prior Publication Data

US 2002/0011025 A1    Jan. 31, 2002

(30) Foreign Application Priority Data

Jun. 20, 2000 (JP) ............................. 2000-184401

(51) Int. Cl.
*A01C 1/06* (2006.01)
(52) U.S. Cl. ................ 47/57.6; 47/DIG. 9; 47/DIG. 11
(58) Field of Classification Search .................. 47/57.6, 47/DIG. 9, DIG. 11; 71/5
See application file for complete search history.

(56) References Cited

U.S. PATENT DOCUMENTS

| | | | | |
|---|---|---|---|---|
| 3,600,830 A | * | 8/1971 | Hamrin | 47/57.6 |
| 3,651,772 A | * | 3/1972 | Garabedian | 111/1 |
| 3,950,891 A | * | 4/1976 | Hinkes | 47/57.6 |
| 4,336,669 A | | 6/1982 | Gordon | |
| 4,562,663 A | * | 1/1986 | Redenbaugh | 800/295 |
| 4,715,143 A | * | 12/1987 | Redenbaugh et al. | 47/57.6 |
| 4,759,151 A | * | 7/1988 | Gerber | 47/57.6 |
| 4,777,762 A | * | 10/1988 | Redenbaugh et al. | 47/57.6 |
| 5,129,180 A | * | 7/1992 | Stewart | 47/57.6 |
| 5,138,793 A | * | 8/1992 | Florin et al. | 47/57.6 |
| 5,525,131 A | * | 6/1996 | Asano | 47/57.6 |
| 5,666,762 A | * | 9/1997 | Carlson et al. | 47/57.6 |
| 5,701,700 A | * | 12/1997 | Kohno et al. | 47/57.6 |
| 5,732,505 A | * | 3/1998 | Carlson et al. | 47/57.6 |
| 6,164,012 A | * | 12/2000 | Lechelt-kunze et al. | 47/57.6 |

FOREIGN PATENT DOCUMENTS

JP           405056707      *   9/1991

OTHER PUBLICATIONS

Population Viability Analysis for the Oyster Plant (*Mertensia maritime*) in the Oslofjord Region by Skarpaas, Division of Botany and Plant Physiology, Department of Biology, University of Oslo , 1998. [http://folk.uio.no/oskarpaa/strandplanter/olav.html.*
Abstract [retrieved from internet http://www.oikos.ekol.lu.se/Oikos. 95.3.abstracts/11173skarpaas.htm] one page.*
Effect of Scarification, GA and chilling on the germination of goldenrain-tree (*Koelreuteria paniculata* Laxm.) seeds, Rehman, Kyungpook National University, South Africa, Dec. 16, 1999, 6 pages.*
The Angelgrove Tree Seed Company, Basic Guidelines & Tips for Germinating Seeds, 9 pages [retrieved from internet http://trees-seeds.com/seed.html].*

* cited by examiner

*Primary Examiner*—Andrea M Valenti
(74) *Attorney, Agent, or Firm*—Butzel Long

(57) ABSTRACT

A method of preventing defective germination or growth of a plant is provided, by which even plant seeds having small size can be sown easily and securely. The method of preventing defective germination or growth of a plant includes the steps of: encapsulating plant seeds in an aqueous gel capsule; refrigerating the plant seeds under the condition that the plant seeds do not germinate; and sowing the plant seeds.

6 Claims, No Drawings

METHOD OF PREVENTING DEFECTIVE GERMINATION OR GROWTH OF PLANT

BACKGROUND OF THE INVENTION (1) Field of the Invention

This invention relates to a method of preventing defective germination or growth of a plant.

(2) Description of the Related Art

So far, a plant, which suffers from the defective germination or defective growth such as rosette-forming during the growth after the germination, is subjected to care of health of the seedling in a cell tray or a pot and kept cold for a predetermined period of time, thereby the defective germination or rosette-forming at high temperature is prevented from occurring.

As to a seed of plant for appreciation, several ten thousands seedlings per 10 ares of field are required. When the seedling needs care of health as mentioned above, it has been very difficult to carry out the care of health of the seedling from the viewpoint of facilities or workability.

Therefore recently, a refrigerating treatment technique of seeds has attracted a considerable attention.

The refrigerating treatment technique of seeds is a technique, in which seeds are preserved in cooled water, and usually can be easily carried out. However, when the seed is small, for example when a body of the seed is as small as 1 mm or less, it is difficult to uniformly sow such seeds. It is all the more difficult to sow wet seeds preserved in water as described above. Since the seeds once wetted are sensitive to high temperature, the drying of such seeds should be performed at relatively low temperature nearly room temperature in order to make the sowing easy, causing an inefficient treatment and significant deterioration in the germination rate. Especially, with regard to a plant for appreciation such as a *Eustoma russellianum*, an effect of the refrigerating treatment is lost or the plant itself becomes extinct.

When the seeds are pelletized seeds, they are not suited to the preservation in cooling water, therefore the above refrigerating treatment technique cannot actually be adapted thereto.

In this respect, a treatment has been proposed, in which the so-called "fluid gel" consisting of granular macromolecular water absorbing entity is employed and the seeds are dispersed in the fluid gel to preserve therein. However, when the seeds are dispersed in the fluid gel before the refrigeration, the fluid gel takes off from the water, failing in holding the seeds. Moreover, it has been difficult to uniformly disperse the seeds, therefore the accuracy of the sowing deteriorates even when the seeds are sown with being dispersed in the fluid gel, and then it has been difficult to sow the seeds according to a plan.

SUMMARY OF THE INVENTION

It is therefore an objective of the present invention to solve the above problem and to provide a method of preventing defective germination or growth of a plant, by which even plant seeds having small size can easily and securely be sown.

In order to attain the above objective, the present invention is to provide a method of preventing defective germination or growth of a plant comprising the steps of: encapsulating one plant seed or a plurality of plant seeds in an aqueous gel capsule; refrigerating the plant seeds under the condition that the plant seeds do not germinate; and sowing the plant seeds.

The size of the plant seed is equal to or less than 1 mm.

The refrigeration is carried out in a dark place.

The plant seed is a seed of a light germinator.

The plant seed encapsulated in an aqueous gel capsule is a pelletized seed.

DESCRIPTION OF THE PREFERRED EMBODIMENTS

In the method of preventing defective germination or growth of a plant according to the present invention, the plant seed must be encapsulated in an aqueous gel capsule.

The aqueous gel, which forms the capsule, is formed from at least one kind of natural or synthetic gel-forming macromolecule selected from the group consisting of: sodium alginate; Gellan gum; xanthan gum; Locust bean gum; carboxymethyl cellulose; pectin; gelatin; Carrageenan; sodium polyacrylate; and agar, and water. When the coexistence of metal ions is needed for gelation, a salt or an alkali supplying such metal ions is suitably added thereto. Further, a preservative, fertilizer component and accelerating agent for for growth can be added thereto as a third component.

The aqueous gel capsule can be prepared, for example, according to a process including the steps of: forming a drop of aqueous solution containing aqueous gel-forming macromolecules at a capillary end; adding one seed or a plurality of seeds into the drop by using a capillary; and dropping the drop into a solution (coagulating solution) containing metal ions that allow the drop to coagulate. At this time, a gas such as air and oxygen can be encapsulated into the drop as the need arises.

The aqueous solution forming an aqueous gel together with the metal ions is a solution of such as sodium alginate and sodium polyacrylate. The metal ion employed for solidifying the aqueous solution to an aqueous gel is a bivalent ion such as calcium ion and barium ion or aluminum ion. Normally, aqueous chloride solution containing the metal ion is employed to prevent a bad influence on the plant body from occurring.

An aqueous solution of carboxymethyl cellulose may be used as the aqueous solution forming an aqueous gel, while an aqueous solution of potassium aluminum sulfate (potassium alum) may be used as the coagulating solution.

Moisture content of the aqueous gel capsule according to the present invention is preferably equal to or more than 90 wt %. When the moisture content is less than 90 wt %, the gel capsule becomes so hard that a germ or a root may not come out from the gel capsule.

After the plant seeds are encapsulated into the aqueous gel capsule, a refrigerating treatment is performed for a predetermined period of time. At this time, the refrigerating treatment must be performed on a condition that the seeds do not germinate. If the seeds germinate during the refrigerating treatment, the germ or root undesirably come out from the gel capsule, the handling and sowing by a machine after the refrigerating treatment become more difficult, a period of time for the refrigerating treatment is forced to be shorter, and as a result the effect of the present invention cannot be attained sufficiently.

A temperature for the refrigerating treatment of the present invention is preferably equal to or lower than 15° C. The period of time for refrigerating treatment is preferably longer than several days and shorter than several months. The refrigerating treatment must be performed under a humidifying condition or in an airtight container so that the water is not lost from the aqueous gel capsule to make the gel capsule hard during the refrigerating treatment.

If the plant is a light germinator, the refrigerating treatment must be performed under a low intensity of illumination so that the plant does not germinate and preferably performed in a dark place.

That is, the method of preventing defective germination or growth of a plant according to the present invention is best adapted to the light germinator with the excellent effect, provided that the refrigerating treatment is performed in a dark place. The light germinator is, for example, *Eustoma russellianum*, begonia, *Campanula portenschlagiana*, large-flowered *Campanula portenschlagiana*, *Digitalis purpurea*, *Primula malacoides*, *Primula obconica*, *Aquilegia*, *Almeria*, *Callistephus chinensis*, *Dianthus*, *Echinacea purpurea*, *Erigeron*, *Gaillardia*, *Helianthus annuus*, *Helenium autumnale*, *Heliopsis*, *Heuchera*, *Incarvillea delavayi*, lychnis, salvia, lettuce, tobacco, perilla, fig, burdock, mitsuba and celery. When the present invention is applied to *Eustoma russellianum*, begonia, *Campanula portenschlagiana*, large-flowered *Campanula portenschlagiana*, *Digitalis purpurea*, *Primula malacoides*, *Primula obconica*, *Helenium autumnale*, Heuchera and tobacco out of the plants described above with the refrigerating treatment in a dark place, an excellent result for each of them can be obtained. Furthermore, when the size of the plant seed is equal to or less than 1 mm, since the seeds are encapsulated in the aqueous gel capsule as described above, an accurate sowing can be easily and securely implemented enabling sowing of the plant seeds with required number thereof, thereby the best effect of the present invention can be attained.

When the plant seed is a seed of *Eustoma russellianum*, the best effect can be attained with the refrigerating treatment in a dark place and at temperature from 8° C. to 12° C.

In the present invention, as a seed that is encapsulated in the aqueous gel capsule, a pelletized seed that is shaped round with a fine diatomaceous earth can be used besides a normal seed. The pelletized seeds can easily be encapsulated into the aqueous gel capsule by the aforementioned method, in which a capillary is used.

EXAMPLES

In the following, the method of preventing defective germination or growth of a plant according to the present invention will be explained with reference to Examples.

A grain of *Eustoma russellianum* seed (seed diameter: about 0.3 mm) was introduced into a drop of 1.5 wt % sodium alginate aqueous solution formed at a lower end of a glass tube by using the tube part of a glass tube, then the drop was dropped into a 10 wt % calcium chloride aqueous solution, thereby a plant seed (seed coated with gel) encapsulated in the aqueous gel capsule was prepared. At this time, the size of the gel capsule was 5 mm in diameter and the moisture content of the coated gel layer was 98.5 wt %.

As to three breeds of *Eustoma russellianum*, i.e. platinum king (hereinafter, A), cute-pink picoty (hereinafter, B) and Tukusinonami (hereinafter, C), seeds coated with gel, 200 grains of each, were prepared as described above on May 9.

These seeds coated with gel were subjected to the refrigerating treatment at 10° C. in a dark place in an airtight container for 35 days, then sown at intervals of 15 cm in a field on June 13. The field was in facilities in which the irrigation and temperature control by light-shielding are possible.

As Comparative Examples, as to the three breeds A, B and C, seeds coated with gel, 200 grains of each, were prepared, then directly sown in a similar manner as described above on June 13, without being subjected to the aforementioned refrigerating treatment.

The seeds of the Examples and those of the Comparative Examples were subjected to an irrigation and temperature control of the same condition with each other, then the progress of these seeds were observed. The result is shown in Tables 1 and 2.

TABLE 1

| Breed | Treatment | Date of Germination | Date of Bolting |
| --- | --- | --- | --- |
| A (Comparative Example) | None | June 24 | August 24 |
| A (Example) | Refrigeration | June 20 | August 13 |
| B (Comparative Example) | None | June 26 | August 25 |
| B (Example) | Refrigeration | June 22 | August 7 |
| C (Comparative Example) | None | June 25 | August 26 |
| C (Example) | Refrigeration | June 21 | August 7 |

TABLE 2

| Breed | Date of Efflorescence | Ratio of Rosette-Forming | Length of Cut Flower |
| --- | --- | --- | --- |
| A (Comparative Example) | November 17 | 30% | 67 cm |
| A (Example) | October 26 | 0% | 82 cm |
| B (Comparative Example) | October 28 | 10% | 66 cm |
| B (Example) | October 22 | 0% | 72 cm |
| C (Comparative Example) | November 6 | 42.5% | 56 cm |
| C (Example) | October 10 | 0% | 70 cm |

Tables 1 and 2 reveal that as to seedlings, to which the method of preventing defective germination or growth of a plant according to the present invention is adapted, periods of germination and efflorescence become earlier and the rosette-forming thereof can be completely prevented from occurring. Furthermore, as to the plants, to which the method of preventing defective germination or growth of a plant according to the present invention is adapted, the length of cut flower, i.e. the length for which the cut flower can be made, becomes longer and the quality as the cut flower is also improved.

The method of preventing defective germination or growth of a plant according to the present invention is an excellent method, by which even plant seeds having small size can easily and securely be sown.

What is claimed is:

1. A method of preventing defective germination or growth of a plant comprising the steps of:
   encapsulating at least one plant seed of a light germinator in an aqueous gel capsule having a moisture content of at least 90% by weight, the at least one plant seed having a size of 1 mm or less;
   refrigerating the at least one plant seed under one of a humidifying condition or in an airtight container so that moisture is not lost from the aqueous gel capsule and under the condition that the at least one plant seed does not germinate; and
   sowing the at least one plant seed.

2. The method of preventing defective germination or growth of a plant according to claim 1, wherein the refrigeration is carried out in a dark place.

3. The method of preventing defective germination or growth of a plant as claimed in claim 1, wherein the at least one plant seed encapsulated in an aqueous gel capsule is a pelletized seed.

4. The method of preventing defective germination or growth of a plant according to claim 1, wherein the step of refrigerating the at least one encapsulated plant seed is conducted at a temperature of about 15° C. or lower and for a sufficient period of time to improve the germination of the at least one encapsulated plant seed as compared to non-refrigerated encapsulated plant seeds.

5. The method of preventing defective germination or growth of a plant according to claim 1, wherein the at least one plant seed comprises a seed of at least one of *Eustoma russellianum*, begonia, *Campanula portenschlagiana*, large-flowered *Campanula portenschlagiana, Digitalis purpurea, Primula malacoides, Primula obconica, Aquilegia, Almeria, Callistephus chinensis, Dianthus, Echinacea purpurea, Erigeron, Gaillardia, Helianthus annuus, Helenium autumnale, Heliopsis, Heuchera, Incarvillea delavayi*, lychnis, salvia, lettuce, tobacco, perilla, fig, burdock, mitsuba and celery.

6. The method of preventing defective germination or growth of a plant according to claim 1, wherein the gel capsule comprises at least one of Gellan gum, xanthan gum, Locust bean gum, carboxymethyl cellulose, pectin, gelatin, Carrageenan, sodium polyacrylate, sodium alginate, and agar.

\* \* \* \* \*